No. 733,354. PATENTED JULY 7, 1903.
F. C. CHEESEWRIGHT.
DRAFT DEVICE FOR AUTOMOBILE FURNACES.
APPLICATION FILED DEC. 31, 1902.
NO MODEL.
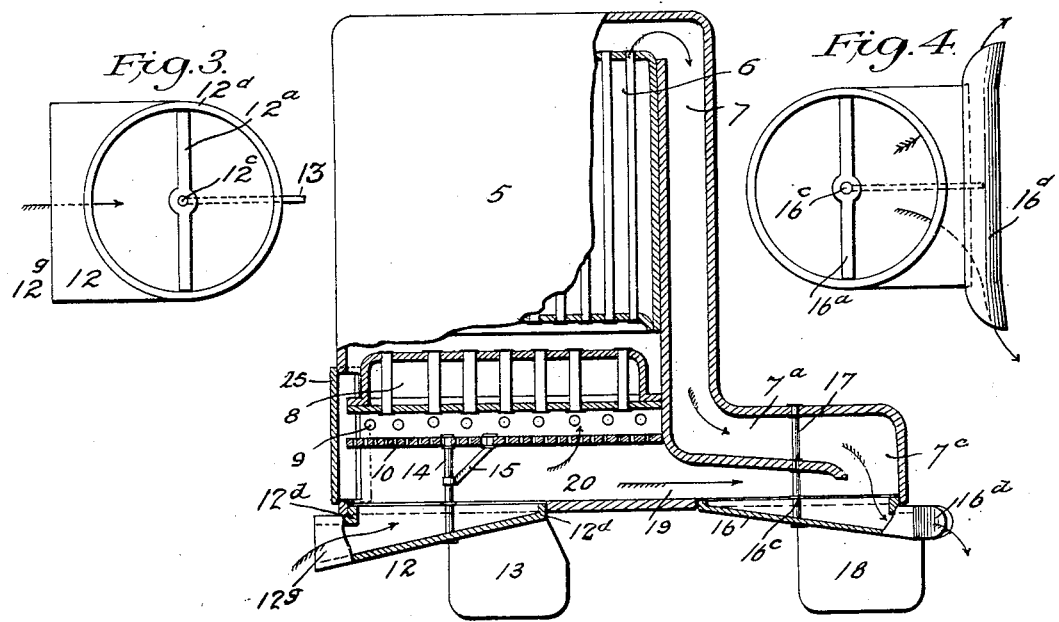
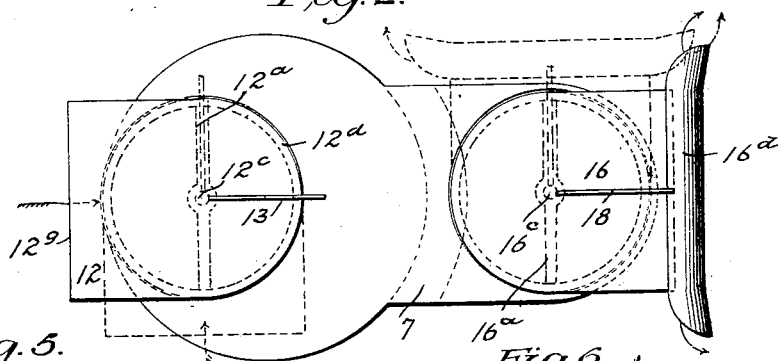
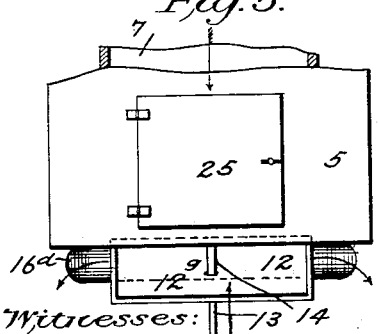

No. 733,354.

Patented July 7, 1903.

UNITED STATES PATENT OFFICE.

FRED CHARLES CHEESEWRIGHT, OF DENVER, COLORADO.

DRAFT DEVICE FOR AUTOMOBILE-FURNACES.

SPECIFICATION forming part of Letters Patent No. 733,354, dated July 7, 1903.

Application filed December 31, 1902. Serial No. 137,229. (No model.)

*To all whom it may concern:*

Be it known that I, FRED CHARLES CHEESEWRIGHT, a citizen of the United States of America, residing in the city and county of Denver and State of Colorado, have invented certain new and useful Improvements in Draft Devices for Automobile-Furnaces; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to automatic means for regulating and controlling the draft of automobile-boilers, my object being to prevent back draft, to increase the supply of air for draft purposes as the velocity of the vehicle increases, and dispense with the fan heretofore provided for obtaining the necessary draft.

My further object is to provide a device of this class which shall be simple in construction, economical in cost, reliable, durable, and thoroughly efficient in operation; and to these ends the invention consists of the features, arrangements, and combinations hereinafter described and claimed, all of which will be fully understood by reference to the accompanying drawings, in which is illustrated an embodiment thereof.

In the drawings, Figure 1 is a side view of an automobile-boiler, the features constituting my improvement being shown in section. Fig. 2 is an underneath view of the same. Fig. 3 is a top view in detail of the rotary device for regulating the induction or admission of air to the burner. Fig. 4 is a similar view of the rotary device for regulating the eduction or escape of the products of combustion. Figs. 5 and 6 are front and rear views, respectively, of the boiler, the upper portion of which is broken away.

The same reference characters indicate the same parts in all the views.

Let the numeral 5 designate the sheet-metal casing of the boiler surrounding the water-tube compartment 6. This casing is provided with a flue 7, leading downwardly from its upper portion for the escape of the products of combustion. The burner 8 is located below the water-tube compartment. Tubes 9 carry the exhaust-steam from the engine (not shown) and discharge it below the burner. Beneath the tubes 9 is a perforated plate or grate 10, through which the air passes to the burner from the rotary induction device 12. This device 12 is provided with a funnel-shaped mouth and a depending blade or wing 13, arranged to keep the mouth of the device directed toward the wind or in the direction from which the wind blows. This device 12 is journaled on a vertical rod or spindle 14, located below the burner and provided with a brace 15. A bar $12^a$ extends transversely across the top of the rotary device, an opening $12^c$ being formed in its central portion, through which the spindle 14 passes. The device 12 is provided with a short upwardly-projecting flange $12^d$, which fits closely in a circular opening formed in the bottom of the casing below the burner. The rear extremity of the apparatus is provided with a similar rotary device, through which the products of combustion escape from the flue 7. The lower extremity of this flue 7 has a rearward horizontal extension $7^a$, and the flue communicates with the device 16 by way of an opening $7^c$. This device 16 is journaled on a vertical spindle 17, made fast in the walls of the flue portion $7^a$, and for this purpose the device is provided with a horizontal bar $16^a$, having a central opening $16^c$ to receive the spindle. To the lower rear extremity of the device 16 is attached a depending blade or wing 18, arranged to keep the discharge-opening of the device pointed in a direction opposite that from which the wind comes. Across the discharge-opening of the device 16 is located a transverse conduit $16^d$, open at both ends for the escape of the products of combustion.

Below the bottom of the flue part $7^a$ there is an opening 19, connecting the chamber 20 below the burner with the device 16, whereby a portion of the air which enters the induction device 12 passes directly through the chamber 20 into the device 16 and across the opening $7^c$, whereby a suction is created in the flue 7 and the draft increased.

When the apparatus is in use, the air enters the funnel-shaped mouth 12ᵍ of the device 12, which is always pointed toward the wind by virtue of the arrangement of the wing 13. The dotted lines in Fig. 2 indicate positions of the parts 12 and 16 at right angles to the position shown in Fig. 1 and at right angles to the direction in which the vehicle is traveling. The air entering this mouth 12ᵍ passes upwardly through the perforated plate 10 and between the exhaust-tubes 9, where it is heated before passing to the burner, from which it passes upward through the fire-tube compartment 6. The products of combustion pass downwardly by way of the flue 7, rearwardly through the flue part 7ª, thence downwardly through the opening 7ᶜ, and finally out through the conduit 16ᵈ to the atmosphere. In the meantime a portion of the air entering the device 12 passes directly through the chamber 20 to the device 16, creating a suction in the tube 7, whereby the direct draft is increased and back draft prevented, as heretofore explained.

Having thus described my invention, what I claim is—

1. An automobile-boiler provided with a movable induction device located below the burner and arranged to be automatically regulated by the wind whereby its mouth is kept pointed toward the wind regardless of the direction of the vehicle's travel.

2. The combination with an automobile-boiler, of a rotary induction device arranged to direct the air to the burner and provided with means adapted to be acted on by the wind to keep the mouth of the device pointed toward the latter.

3. The combination with an automobile-boiler, of a rotary induction device for delivering air to the burner, the said device being provided with a depending blade or wing arranged to be actuated by the wind to keep the mouth of the induction device pointed toward the direction from which the wind comes.

4. The combination with a boiler and a burner for heating the same, of a rotary induction device arranged below the burner, and having a funnel-shaped opening provided with means for automatically maintaining said opening in the direction of the wind when acted on by the latter.

5. The combination with an automobile boiler and burner, of a casing inclosing the said parts, and a rotary induction device engaging an opening formed in the bottom of the casing, said device having a funnel-shaped mouth and a depending wing or blade to keep the mouth in the direction of the wind when acted on by the latter.

6. The combination with an automobile boiler and casing, of an induction device having a funnel-shaped opening and provided with an upwardly-projecting flange fitting a circular opening formed in the front portion of the bottom of the casing, a vertical spindle on which the said device is journaled, and a blade or wing attached to the bottom of the device for automatically keeping the mouth of the latter in the direction of the wind.

7. The combination with an automobile-boiler, of a casing having an induction-opening in front, an eduction-opening in the rear, a rear flue leading downwardly from the top of the boiler to receive the products of combustion and carry them to the eduction-opening, the casing having a passage below the burner leading from the induction to the eduction opening and past the lower extremity of the said flue to create suction and prevent back draft, substantially as described.

8. The combination with an automobile-boiler and a burner therefor, of a casing having a rearwardly-located, downwardly-extending flue for the escape of the products of combustion, and an induction device revolubly mounted in the rear bottom portion of the casing with which device said flue communicates, and means connected with said device whereby it is automatically regulated and held in position by the action of the wind.

9. The combination with a vehicle-boiler and a burner therefor, of a casing having a downwardly-extending, rearwardly-located flue for the escape of the products of combustion, a rotary eduction device with which said flue communicates at its lower extremity, said device having a transverse, open-ended discharge-conduit, the rotary device having a depending blade whereby its position is automatically regulated by the action of the wind.

10. The combination with a vehicle boiler and burner, of a rotary device for the escape of the products of combustion, said device being located in the lower rear portion of the casing and provided with a depending blade or wing for automatically regulating the position of the said device, substantially as described.

11. The combination with a boiler and burner adapted for use on an automobile or other vehicle, of a rearwardly-located, downwardly-extending flue for the escape of the products of combustion, and a rearwardly-located rotary device for receiving the products of combustion from said flue, said device having a depending blade or wing and a transverse, open-ended conduit for the discharge of the products of combustion to the atmosphere.

12. The combination with a boiler adapted for use on an automobile or other vehicle, of a casing, an induction device, and an eduction device mounted on the bottom of the casing and arranged to rotate, and a plate or wing connected with each of said devices whereby they are automatically regulated by the wind.

13. The combination with a boiler, of a casing, an induction device and an eduction device mounted in the bottom of the casing and arranged to rotate to conform to the direction of the wind and constructed to be automatically regulated thereby, substantially as described.

14. The combination with a boiler, of a casing, an induction device revolubly mounted in the bottom of the casing and provided with a depending blade or wing, an eduction device revolubly mounted in the bottom of the casing in the rear of the induction device, said eduction device being provided with a depending blade or wing and a transverse, open-ended conduit for the discharge of the products of combustion.

In testimony whereof I affix my signature in presence of two witnesses.

FRED CHARLES CHEESEWRIGHT.

Witnesses:
DENA NELSON,
A. J. O'BRIEN.